United States Patent [19]

Cusumano

[11] 3,962,285
[45] June 8, 1976

[54] OLEFIN OXIDATION PROCESS

[75] Inventor: James A. Cusumano, Rahway, N.J.

[73] Assignee: Exxon Research and Engineering Company, Linden, N.J.

[22] Filed: May 22, 1974

[21] Appl. No.: 472,170

Related U.S. Application Data

[63] Continuation-in-part of Ser. No. 259,929, June 5, 1972, Pat. No. 3,844,981, which is a continuation-in-part of Ser. No. 887,747, Dec. 23, 1969, abandoned.

[52] U.S. Cl............................ 260/348.5 R; 252/476
[51] Int. Cl.² ........................................ C07D 301/10
[58] Field of Search ................................ 260/348.5

[56] References Cited
UNITED STATES PATENTS

| | | | |
|---|---|---|---|
| 2,404,438 | 7/1946 | Evans.............................. | 260/348.5 |
| 3,664,970 | 5/1972 | De Maio............................ | 252/454 |
| 3,775,346 | 11/1973 | Calcagno et al..................... | 252/463 |
| 3,844,981 | 10/1974 | Cusumano.......................... | 252/471 |

FOREIGN PATENTS OR APPLICATIONS

| | | |
|---|---|---|
| 1,049,843 | 3/1959 | Germany |
| 811,828 | 4/1959 | United Kingdom |

OTHER PUBLICATIONS

Mitani et al., Hokkaido Daigaku Kogakubi Hokoku, vol. VIII, No. 1, (Oct. 1947), Abstract of pp. 75–106.
W. H. Flank et al., Journal of Catalysis, vol. 8, (1967), pp. 316–325.

Primary Examiner—Norma S. Milestone
Attorney, Agent, or Firm—Robert J. Baran; Joseph J. Allocca

[57] ABSTRACT

The instant invention relates to a process for oxidizing olefins to their corresponding epoxides by contacting said olefin with oxygen in the presence of a multimetallic condition at oxidation conditions. Preferably, this process is utilized to oxidize ethylene to ethylene oxide by contacting ethylene in the presence of oxygen with a silver catalyst promoted by one or more metals combined with silver in an alloy. The promoter metals are selected from the group consisting of platinum, rhenium, palladium, ruthenium, iron, copper, and gold. Preferably, the catalysts used in the process of the instant invention are bimetallic catalysts comprising silver in combination with a promoter metal selected from the group consisting of palladium, ruthenium or rhenium, preferably rhenium and ruthenium, and most preferably rhenium.

The catalysts are prepared by contacting a silver salt or silver oxide having a surface area of from 20–40 $M^2/gm$ with a solution containing a decomposable salt of said promoter metal, at impregnating conditions, drying said impregnated salt and activating said dried impregnated silver oxide or silver salt by contacting with a reducing environment, preferably hydrogen at a temperature of from 100° to 500°C, more preferably from 150° to 300°C. Catalysts prepared in this manner are characterized as comprising a bulk phase of substantially pure silver and a surface alloy phase of silver and said promoter metal.

9 Claims, No Drawings

OLEFIN OXIDATION PROCESS

CROSS REFERENCE TO RELATED APPLICATIONS

The instant application is a C.I.P. of U.S. Ser. No. 259,929, filed on June 5, 1972, now U.S. Pat. No. 3,844,981 which is a C.I.P. of U.S. Ser. No. 887,747, filed on Dec. 23, 1969, now abandoned.

BACKGROUND OF THE PRIOR ART

1. Field of the Invention

The instant invention relates to a process for oxidizing olefins to their corresponding epoxides by contacting said olefin with oxygen in the presence of a multimetallic condition at oxidation conditions. Preferably, this process is utilized to oxidize ethylene to ethylene oxide by contacting ethylene in the presence of oxygen with a silver catalyst promoted by one or more metals combined with silver in an alloy. The promoter metals are selected from the group consisting of platinum, rhenium, palladium, ruthenium, iron, copper, and gold. Preferably, the catalysts used in the process of the instant invention are bimetallic catalysts comprising silver in combination with a promoter metal selected from the group consisting of palladium, ruthenium or rhenium, preferably rhenium and ruthenium, and most preferably rhenium.

The catalysts are prepared by contacting a silver salt or silver oxide having a surface area of from 20–40 $M^2$/gm with a solution containing a decomposable salt of said promoter metal, at impregnating conditions, drying said impregnated salt and activating said dried impregnated silver oxide or silver salt by contacting with a reducing environment, preferably hydrogen at a temperature of from 100° to 500°C, more preferably from 150° to 300°C. Catalysts prepared in this manner are characterized as comprising a bulk phase of substantially pure silver and a surface alloy phase of silver and said promoter metal.

2. Description of the Prior Art

The use of ethylene oxidation catalysts comprising silver promoted with various other metals has been taught in the prior art. For example, U.S. Pat. No. 2,605,239 teaches a silver-BeO catalyst which is prepared by a coprecipitation technique.

U.S. Pat. No. 3,144,416 teaches a silver catalyst for use in an ethylene oxide process wherein catalytic silver powder is dispersed in electrolytic silver and molded. Promoters which are useful in forming the catalyst described in this patent include copper, gold, or the oxides thereof.

U.S. Pat. No. 2,143,371 teaches a method for preparing a silver catalyst for ethylene oxidation, which comprises mechanically converting bulk silver, which may be alloyed with gold, copper or iron, into catalytically active flakes. The catalysts produced by this method would have the promoter metal uniformly distributed throughout the catalyst.

German Pat. No. 717,201 teaches that an ethylene oxidation catalyst may be prepared by the reaction of silver nitrate, copper nitrate and gold chloride with hydrazine. This catalyst preparation technique relies on a coprecipitation of all three of the metals from solution, thus, once again, providing a catalyst which is substantially homogeneous with regard to metal promoter concentration throughout the catalyst.

German Pat. No. 1,048,898 teaches preparation of a silver catalyst for ethylene oxide production wherein said silver is in combination with an alkaline earth oxide and a heavy metal promoter. This catalyst preparation technique calls for the coprecipitation of the silver and the heavy metal by use of the alkaline earth material and the deposition of the wet precipitated mass on an inert carrier. This catalyst preparation technique also relies, on coprecipitation and further since an inert carrier is utilized, to support the catalyst, it would be expected that insufficient heat dissipation during use, would be obtained, unlike catalyst of the instant invention wherein silver metal provides the bulk of the catalyst.

German Pat. No. 1,068,684 teaches that a silver catalyst for ethylene oxide production may be prepared by treating a silver nitrate solution containing a few % alkaline earth nitrate with ammonium oxalate and thermally decomposing the resulting silver oxalate, followed by washing, drying and grinding. Once again, this reference teaches the incorporation of promoters, such as small amounts of gold, copper and iron, or peroxides, oxides or hydroxides of barium, strontium or lithium. The catalyst preparation technique disclosed relies on precipitation of a soluble silver salt.

U.S. Pat. No. 2,605,239 teaches the use of silver catalysts wherein beryllium oxide is incorporated as a promoter. The patentee also discusses the use of other promoters, such as copper, aluminum, manganese, cobalt, iron, magnesium, gold, thorium, nickel, cadmium, cerium and zinc. This patent does not recognize the use of platinum, palladium, ruthenium or rhenium as promoters. Furthermore, the patentee incorporates these promoter metals by mechanical mixture or coprecipitation. Thus, it is clear that the patentee does not form multimetallic catalysts similar to the specific alloy-type catalyst of the instant invention.

U.S. Pat. No. 3,664,970 teaches impregnating a silver salt solution into the pores of an alumina support and drying to prepare a supported silver catalyst for ethylene oxidation. The reference teaches that promoter metals can be co-impregnated along with the silver salt. Said promoter metals include barium, copper, mercury and tin. The patentee nowhere recognizes the advantage of utilizing platinum, palladium, ruthenium or rhenium as promoter metals nor does he recognize the advantages of using the unsupported alloy catalysts of the instant invention.

U.S. Pat. No. 2,424,083 teaches the preparation of an ethylene oxidation catalyst by precipitating silver on an inert support by the reduction of an aqueous silver ammonium complex in the presence of said support. This reference teaches that a thin film of silver in the form of a catalytically active silver mirror is deposited upon said support. The patentee discusses the use of promoter metals, such as gold, copper, platinum, nickel and iron, however, there is no discussion of how to incorporate these promoters so as to obtain an alloy catalyst. Furthermore, the patentee does not recognize the advantage of utilizing rhenium, palladium nor ruthenium as a promoter for a silver ethylene oxide catalyst.

Thus, it is clear that none of the references recognize the advantages of using rhenium, ruthenium or palladium as a promoter metal for a silver-based olefin oxidation catalyst nor do these references recognize the use of these metals in combination with silver in alloy form. Furthermore, none of these techniques recognize the extremely improved catalysts prepared by this specific methods utilized in preparing the catalysts of the instant invention, i.e. wherein the catalyst is characterized as having the promoter metal in substantially high concentration at the surface and the bulk portion of the catalyst is substantially pure silver metal.

This distribution of promoter metal allows the most economical utilization of specific promoters which are significantly more expensive than silver while obtaining results equal to or better than the prior art promoted silver catalysts. For example, ruthenium, platinum, palladium or rhenium will be in substantial concentration at the catalytic surface thus allowing much decreased amounts of promoter to be utilized without loss of catalytic effect. Provision for substantially pure silver in the interior of the catalyst may provide more effective heat dissipation than is the case with a catalyst having promoter metals distributed evenly throughout.

Further, none of the instant references appear to teach that a water insoluble silver salt or silver oxide having surface area of from between 20 and 40 m$^2$/g is advantageously utilized in forming the silver catalysts useful in the instant invention. It has been found that silver salts or silver oxide with a surface area of less than 20 m$^2$/g forms a catalyst which requires high temperatures to achieve reasonable conversions, thus causing decreased selectivity especially in ethylene oxide processes. Silver salts or silver oxide having a surface area of greater than 40 m$^2$/gm provides a catalyst which yields excellent conversions but low selectivity to the desired epoxide product. Finally, the processes taught in the prior art which utilize multimetallic catalysts for olefin or ethylene oxidation do not use catalysts prepared by the impregnation technique described below wherein substantially all of the solution of the decomposable salt is impregnated into the pores of the water insoluble silver salt. This technique provides superior multimetallic catalysts since increased contacting of the promoter metal with the silver metal at the surface and the avoidance of agglomeration of separate promoter metal particles upon activation is achieved.

SUMMARY OF THE INVENTION

According to this invention, it has unexpectedly been found that an improved process for the oxidation of $C_1$ to $C_{10}$ alpha olefins to the corresponding 1,2 epoxides is obtained by utilizing a multimetallic catalyst comprising minor amounts of one or more promoter metals selected from the group consisting of palladium, ruthenium, rhenium, iron and platinum and a major amount of silver. Preferably, these catalysts are prepared by a technique in which silver oxide or a water insoluble silver salt such as the halides, carbonate or $C_2$ to $C_{10}$ carboxylates, preferably the oxide, carbonate, formate or lactate, and most preferably the oxide, and which has a surface area of from 20 to 40 m$^2$/g, preferably 25 to 35 m$^2$/g, is impregnated with a solution containing a decomposable salt of the promoter metal. When prepared by this method, the promoter metals are combined with silver in a surface alloy phase while the interior phase of the catalyst particle is substantially pure silver. The salts which may be used include soluble nitrates or chlorides of said metals. The surface area limitations described above are preferred in that lower surface areas give insufficient catalyst activity in the finished catalyst while higher surface areas give inferior selectivity to the desired epoxide products.

Impregnation, using silver oxide as an example, takes place as follows: Silver oxide powder is comingled with an aqueous solution of the designated metal salts, e.g. platinum chloride, chloroplatinic acid, palladium nitrate, palladium chloride, ammonium chloropalladite, ruthenium trichloride, ruthenium nitrosyl nitrate, iron chloride, iron nitrate, iron halides, rhenium trichloride or any other soluble salt of these metals. A minimum amount of water is used and the resulting impregnated product is merely damp, i.e. just the pores are filled with the aqueous solution. The impregnated silver oxide is dried, reduced, preferably in a hydrogen atmosphere, and preferably is then washed with water and NH$_4$OH solutions. The drying and reduction may be carried out simultaneously, but preferably serially. Of course, the metal salts may be dissolved in any solvent wherein they are sufficiently soluble, but for convenience, aqueous impregnating solutions are used. The catalysts used in this invention may also be prepared by the novel method disclosed in U.S. Ser. No. 466,168, filed in the name of J. A. Cusumano, on May 2, 1974, and herein incorporated by reference.

Drying may be readily effected by prolonged exposure to warm air. Temperature of the air may vary from 50° to 100°C., the drying period may last from 16–24 hours.

The reducing step serves to bring both the silver oxide or silver salt and the impregnated salt down to their respective metallic states, and this is necessary to activate the instant catalyst; it appears that reducing causes an alloy to form at the surface of the catalyst particle. The resulting catalyst is powdered in texture, but may be pelletized as desired.

Typically, the reduction will take place in a hydrogen environment. The reduction is affected at a temperature of 100° to 500°C, preferably 150° to 300°C, by passing hydrogen over the impregnated silver salt or oxide at a rate of 5 to 25 liters/hr/gram of catalyst. Other reducing agents may be utilized but hydrogen is preferred.

Washing takes place in a basic environment, preferably ammonium hydroxide. Several wash stages in which 50% ammonium hydroxide and distilled water are alternated may be used; typically there are 5 to 10 wash stages.

The catalyst may contain 0.1 to 10 wt. % of the promoter metal and about 90 to 99.9 wt. % silver; preferably about 0.5 to 5 wt. % of the promoter metal, and about 95 to 99.5 wt. % of silver; and most preferably about 0.5 to 2 wt. % of the promoter metal, and about 98 to 99.5 wt. % silver.

The preferred catalysts for use in the instant process are bimetallic, e.g. silver-platinum, silver-palladium, silver-ruthenium and silver-rhenium. The bi-metallic catalyst of the instant invention may be promoted and stabilized in a manner similar to that used with the silver catalysts of the prior art. For example, the catalyst may be stabilized against long-term deactivation by mixing 5–10% by wt. of barium peroxide with the silver oxide before it is impregnated with the promoter metal salt. Thus, a mixture of 8 g. barium peroxide and 92 g. silver oxide may be wetted with just enough water to make a homogeneous paste. This paste may then be dried over a steam bath with constant agitation, prior to impregnating with the promoter metal salt solution, followed by the above-described drying and reduction steps.

Additional promotion of the bimetallic catalysts is accomplished by keeping a constant concentration of ethylene dichloride in the feed stock. This concentration may range anywhere from 1 to 1000 parts per million but the 5 to 100 range is preferred and the 5 to 20 range is most preferable. With this technique, the bimetallic catalysts of the instant invention may be promoted from 70% selectivity to about 80% selectivity at similar conversions.

The process of the instant invention is utilized to oxidize olefins, preferably $C_2$ to $C_{10}$ alpha olefins to their corresponding epoxides. Preferred alpha olefin reactants are selected from the group consisting of 1-butene, propylene and ethylene, and most preferably ethylene. Conditions for the halide-promoted ethylene oxidation reactions are essentially the same as when halide (e.g. ethylene dichloride) is not used. The process of the instant invention may be illustrated by the conversion of ethylene to ethylene oxide.

The reaction mixture comprises about 20–40 wt. % oxygen, about 5–20 wt. % ethylene and the remainder about 40–75 wt. % of an inert gas such as nitrogen or helium. The inert gas serves to reduce the explosive limits of the mixture. A mixture of ethylene and air may also be utilized since this would supply both the oxygen and the nitrogen. The reactants are contacted with the catalyst at a temperature of 100° to 400°C, preferably 175° to 300°C and most preferably 200° to 300°C. Pressures which may be utilized may range from 1 to 20 atm., preferably 1 to 2 atm. and most preferably about 1 atm. The reactants may be passed over the catalyst at a space velocity of 1000 to 4000, preferably 1500 to 2500 and most preferably 1800 to 2200 V/V/hr. In the process of the instant invention, the typical product breakdown recovered is as follows: About 60 to 80 mole % $C_2H_4O$ the rest being $CO_2+H_2O$.

The catalyst is utilized in the form of 20–40 mesh catalyst particle size. The catalyst can also be conveniently diluted with low surface area diluents such as silica, alumina or carborundum. The type of reactor utilized is not critical but it is preferred to use a fixed bed reactor heated in a fluidized sand or molten salt bath.

In the preferred embodiment of the instant invention, the catalysts are preferably bimetallic Ag-Pd, Ag-Ru, or Ag-Re, most preferably Ag-Re.

SPECIFIC EMBODIMENTS

EXAMPLE 1

In this example, ethylene and oxygen were reacted to form ethylene oxide using a variety of catalysts. All runs were made at 1 atmosphere. The ethylene was oxidized in the presence of helium and the mole ratio of ethylene to oxygen to helium was 1:5:10. In all instances, 8.6 grams of catalyst were diluted to 10 cc with silica beads. The combined feedstream of ethylene, oxygen, and helium was passed over the catalyst at a rate of 1800 V/V/hr. The reactor utilized was a glass U-tube reactor 15 mm I.D. fixed in a fluidized sand bath.

The catalysts comprised the following bimetallic catalyst: silver and 0.5 wt. % rhenium, silver and 0.5% copper and silver and 0.5% gold. The catalysts were prepared by impregnating a high surface area silver oxide, which had a surface area of about 30 m²/g, with aqueous solutions of salts of the above-mentioned metals, followed by drying at 60° to 70°C (for 16 hrs. in air).

The silver-gold catalyst was prepared from a solution of $HAuCl_4$, the silver-rhenium catalyst was prepared from a solution of rhenium chloride and the silver-copper catalyst was prepared from a solution of copper nitrate.

The dried catalysts were then carefully reduced in 10% hydrogen in a helium gas stream at 200°C for about 4 hours. This served to activate the catalyst. Catalysts were then washed by the following technique for each batch of 20 grams of catalysts: Initially the catalyst was slurried with 500 cc's of distilled water, decanted and slurried again for 1 hour with 400 cc's of 50 percent ammonium hydroxide. The catalyst was then filtered and washed with 1 liter of distilled water, slurried for 1 hour with 400 cc's of 50 percent ammonium hydroxide in water and rinsed with 500 cc's of distilled water. The procedure was repeated five times and finally the mixture was filtered and dried over night at 110°C.

All impregnations were done using a well-dried sample of $Ag_2O$ plus a sufficient amount of the pertinent salt to give the necessary bimetallic composition. In every case only 0.23 cc of water was used per gram of $Ag_2O$. Thus, for example, to make an 0.5 wt. % Au in Ag catalyst one would dissolve 0.15 g. of $HAuCl_4·3H_2O$ in 3.75 cc $H_2O$ and impregnate 16.1 g. of $Ag_2O$ with this solution. It is then dried at 60°C over night and finally reduced as described above in a 10% $H_2$ in He mixture.

The catalysts were then utilized in the oxidation of ethylene to ethylene oxide, with the results indicated in the following table.

TABLE I

EFFECT OF GOLD, COPPER AND RHENIUM ON THE SELECTIVITY OF SILVER FOR ETHYLENE OXIDATION TO ETHYLENE OXIDE

Reaction: $2C_2H_4 + O_2 \rightarrow 2C_2H_4O$

| Catalyst | % Conversion (a) | % Selectivity (To $C_2H_4O$) (b) | T°C of Reaction |
|---|---|---|---|
| Ag | 60 | 49 | 212 |
| Ag, 0.5% Au | 60 | 70 | 255 |
| Ag, 0.5% Re | 60 | 70 | 250 |
| Ag, 0.5% Cu | 60 | 60 | 280 |

(a) Percent conversion = $\dfrac{\text{moles } C_2H_4 \text{ reacted}}{\text{moles } C_2H_4 \text{ Fed}}$ (b) Percent selectivity ($C_2H_4O$) = $\dfrac{\text{moles } C_2H_4 \text{ converted to } C_2H_4O}{\text{moles } C_2H_4 \text{ converted}}$ % Selectivity and % conversion were determined by gas chromatographic analysis.

From the above results we see that the silver had the lowest selectivity to ethylene oxide, only about 49%. The silver-gold and silver-rhenium were the best with about 70% selectivity to ethylene oxide. Silver-copper was also significantly superior to silver with a selectivity of about 60%.

EXAMPLE 2

Utilizing the exact conditions of Example 1, except for the catalyst which is silver-ruthenium, ethylene is again converted to ethylene oxide. One prepares the 0.5 Ru–99.5 Ag ruthenium-silver catalyst by dissolving 0.266 grams into $RuCl_3·nH_2O$ (38.6% Ru) into water to make 4.05 cc volume. Then impregnate 20.41 grams $Ag_2O$. The catalyst is then dried at 60°C and reduced and washed as indicated in Example 1. About 70% selectivity to ethylene oxide is observed as determined in Example 1.

EXAMPLE 3

This catalyst was prepared by Electrochemical Displacement technique disclosed and claimed in U.S. Ser. No. 466,168 filed by J. A. Cusumano on May 2, 1974. First, Ag metal is prepared by adding a 50% KOH solution (250 gm KOH in 250 cc distilled $H_2O$) via a burette in 15 minutes to a solution of 454.5 gm $AgNO_3$ and 45 grams of dextrose dissolved in 4500 ml of distilled $H_2O$. The solution is stirred rapidly while adding the KOH solution and then for an additional 45 minutes upon completion of the KOH addition. The solution is then heated to 72°C and stirred for 45 additional minutes. It is filtered, dried at 110°C, washed with 2 liters of $H_2O$, dried again at 110°C and washed again with 2 liters of $H_2O$. It is subsequently dried for 72 hours at 120°C. The final product has a surface area of 1 $m^2$/gm Ag (i.e. a particle size of about 6000 A). The preferred multimetallic catalysts, for use in the process of the instant invention will have a surface area of from 0.1 to 30 meters$^2$/gram, preferably from 0.5 to 10 meters$^2$/gram after activation. Thus this, and the other catalysts disclosed in the examples are within the preferred limits of this invention.

An Ag-Pt surface alloy consisting of pure Ag particles with 7% of their surface covered with Pt metal is prepared by washing 15 gm of the above prepared Ag powder with 150 cc of $NH_4OH$ (75 cc conc. $NH_4OH$ and 75 cc of $H_2O$) and then with 1000 cc of $H_2O$. The powder was then filtered and slurried in 150 cc of $H_2O$ containing $3 \times 10^{-4}$ gm Pt (as $H_2PtCl_6$) for 1.5 hours. It was then filtered, and washed with 1000 cc $H_2O$, followed by 150 cc of a solution of $NH_4OH$ (75 cc conc. $NH_4OH$ and 75 cc $H_2O$). It was again filtered and washed with 1000 cc of $H_2O$ and finally dried in air at 110°C. An analysis of the Ag-Pt catalyst by atomic fluorescence spectroscopy indicated the only constituents of significance were Ag and Pt. Analysis of the final Pt solution showed all of the Pt was removed from solution and replaced by an equivalent number of Ag atoms from the surface of the Ag particles. The resultant catalyst consisted of 6000 A particles of Ag with 7% of the Ag surface covered with Pt atoms.

All of the following catalysts were prepared by impregnation of high surface area $Ag_2O$.

Preparation of High Surface-Area $Ag_2O$

Add a 9.1% KOH solution (146 gm KOH dissolved with 1460 cc distilled $H_2O$) to a solution of 450 gm $AgNO_3$ dissolved with 4500 cc distilled $H_2O$ over a period of 30 minutes via a dropping funnel. The solution was stirred during precipitation and then for 1 additional hour. The precipitate was then filtered, dried and then washed by slurrying with several liters of distilled $H_2O$ until the pH of the filtrate was $\leq 7$. It was subsequently filtered and dried for 72 hours at 120°C.

0.5 wt. % Cu/Ag

Dissolve 0.57 gm $Cu(NO_3)_2 \cdot 3H_2O$ in 6.4 cc of distilled $H_2O$ and impregnate 32.22 gm of $Ag_2O$. Dry 16 hours at 60°C. Then reduce 4 hours at 200°C with 10% $H_2$ in He.

0.5 wt. % Re/Ag

Dissolve 0.235 gm $ReCl_3$ in 6.4 cc of distilled $H_2O$ and impregnate 32.22 gm of $Ag_2O$. Dry 16 hours at 60°C. Then reduce 4 hours at 200°C with 10% $H_2$ in He. Wash this catalyst by slurrying it for 45 minutes with conc. $NH_4OH$. Then rinse 6 times with 1000 cc $H_2O$. Dry 16 hours at 60°C.

0.5 wt. % Pd/Ag

Dissolve 0.406 gm ammonium chloropalladite in 6.2 cc distilled $H_2O$ and impregnate 32.2 gm of $Ag_2O$. Reduce 4 hours at 200°C in 10% $H_2$ in He. Wash catalyst by slurrying it for 45 minutes with conc. $NH_4OH$. Then rinse 6 times with 1000 cc $H_2O$. Dry at 60°C for 16 hours.

0.5 wt. % Fe/Ag

Dissolve 0.689 gm ferric nitrate (13.8% Fe metal) in distilled $H_2O$ to a total volume of 4.1 cc. Impregnate 20.41 gm. of $Ag_2O$ with this solution. Dry at 60°C for 16 hours. Reduce 4 hours at 200°C in 10% $H_2$ in He.

Catalytic Runs

All catalysts were run at atmospheric pressure in a flow reactor at a GHSV of about 2000 v/v/hr. The catalyst charge was 9 cc (8–10 gm). The helium, oxygen and ethylene flows were 188.1, 93.0 and 18.9 cc STP/min, respectively. The data are tabulated in Tables 2–6 and plotted in FIG. 1.

TABLE 2

OXIDATION OF ETHYLENE OVER Ag-Pt SURFACE ALLOY
$\theta(Pt) = 7.0\%$ ($2 \times 10^{-5}$ GM Pt/GM Ag)

| Temp °C | % Conversion | % Selectivity to ETO |
| --- | --- | --- |
| 192 | 25.3 | 51.2 |
| 212 | 43.9 | 53.7 |
| 232 | 70.7 | 54.0 |

TABLE 3

OXIDATION OF ETHYLENE OVER 0.5 WT. % Cu/Ag ALLOY

| Temp °C | % Conversion | % Selectivity to ETO |
| --- | --- | --- |
| 192 | 5.8 | 59.0 |
| 208 | 10.7 | 60.1 |
| 227 | 19.8 | 61.9 |
| 245 | 32.6 | 59.7 |
| 267 | 56.6 | 55.1 |

TABLE 4

OXIDATION OF ETHYLENE OVER 0.5 WT. % Re/Ag ALLOY

| Temp °C | % Conversion | % Selectivity to ETO |
| --- | --- | --- |
| 179 | 6.2 | 71.2 |
| 194 | 11.2 | 69.7 |
| 211 | 18.8 | 67.6 |
| 227 | 25.6 | 69.7 |
| 244 | 35.2 | 69.4 |
| 260 | 42.0 | 68.8 |

TABLE 5

OXIDATION OF ETHYLENE OVER 0.5 WT. % Pd/Ag ALLOY

| Temp °C | % Conversion | % Selectivity to ETO |
| --- | --- | --- |
| 177 | 6.2 | 77.2 |
| 192 | 7.5 | 76.2 |
| 207 | 10.7 | 77.0 |
| 225 | 8.6 | 76.1 |

TABLE 6

OXIDATION OF ETHYLENE OVER 0.5 WT. % Fe/Ag ALLOY

| Temp °C | % Conversion | % Selectivity to ETO |
| --- | --- | --- |
| 161 | 3.3 | 70.9 |
| 175 | 3.3 | 70.1 |

TABLE 2-continued

OXIDATION OF ETHYLENE OVER Ag-Pt SURFACE ALLOY
$\theta(Pt) = 7.0\%$ ($2 \times 10^{-5}$ GM Pt/GM Ag)

| Temp °C | % Conversion | % Selectivity to ETO |
|---------|--------------|----------------------|
| 191     | 3.2          | 66.8                 |

What is claimed is:

1. A process for oxidizing ethylene to ethylene oxide which comprises contacting said ethylene, in the presence of oxygen, under oxidation conditions, such oxidation conditions comprising mixing about 20 to 40 wt. % oxygen, about 5 to 20 wt. % ethylene and about 40 to 75 wt. % of an inert gas at a temperature of from 100° to 400°C and a pressure of from 1 to 20 atm with a bimetallic catalyst, said catalyst comprising from 90 to 99.9 wt. % of silver and from 0.1 to 10 wt. % of a promoter metal present as a surface alloy phase which promoter metal is rhenium, at a space velocity of 1000 to 4000 V/V/hr. and thereby converting at least a portion of the ethylene to ethylene oxide.

2. The process of claim 1 wherein said inert gas is nitrogen.

3. The process of claim 1 wherein said inert gas is helium.

4. The process of claim 1 wherein said catalyst has a surface area of from 0.1 to 30 meters²/gm.

5. The process of claim 4 wherein said catalyst is prepared by impregnating by the incipient wetness technique silver oxide having a surface area of from 20 to 40 meter²/gram or a salt of silver selected from the group consisting of silver carbonate, silver halides and silver carboxylates having from 1–10 carbon atoms with a solution of a rhenium salt at conditions whereby said silver oxide or said silver salt is impregnated with said rhenium salt solution, drying said impregnated silver oxide or said silver salt at from about 50°–100°C and reducing said dried impregnated silver oxide or the silver salt at a temperature of from 100° to 500°C in a reducing atmosphere to activate said catalyst, thereby yielding a catalyst wherein the silver component ranges from 90 to 99.9 wt. % and the rhenium component ranges from 10 to 0.1 wt. %.

6. The process of claim 5 wherein the desired promoter metal salt impregnated silver oxide or silver salt is reduced in a hydrogen atmosphere which hydrogen atmosphere is passed over the catalyst at from 5 to 25 liters/hr./gm. of catalyst at a temperature of from about 100°–500°C, preferably 150°–300°C.

7. The process of claim 6 wherein said catalyst is prepared from silver oxide.

8. The process of claim 5 wherein the silver salt is a water insoluble silver salt and the solution of a rhenium salt is an aqueous solution.

9. The process of claim 5 wherein the rhenium salt is selected from the group consisting of rhenium chlorides and rhenium nitrates.

* * * * *